(12) United States Patent
Vyas et al.

(10) Patent No.: US 11,503,266 B2
(45) Date of Patent: Nov. 15, 2022

(54) SUPER-RESOLUTION DEPTH MAP GENERATION FOR MULTI-CAMERA OR OTHER ENVIRONMENTS

(71) Applicant: Samsung Electronics Co., Ltd., Suwon-si (KR)

(72) Inventors: Kushal Kardam Vyas, Santa Clara, CA (US); Yingmao Li, Allen, TX (US); Chenchi Luo, Plano, TX (US); George Q. Chen, Plano, TX (US); Hamid R. Sheikh, Allen, TX (US); Youngjun Yoo, Plano, TX (US); Michael O. Polley, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/811,585

(22) Filed: Mar. 6, 2020

(65) Prior Publication Data

US 2021/0281813 A1   Sep. 9, 2021

(51) Int. Cl.
*H04N 13/128*    (2018.01)
*G06T 3/40*    (2006.01)
(Continued)

(52) U.S. Cl.
CPC ......... *H04N 13/128* (2018.05); *G06T 3/4053* (2013.01); *G06T 5/002* (2013.01);
(Continued)

(58) Field of Classification Search
None
See application file for complete search history.

(56) References Cited

U.S. PATENT DOCUMENTS 10,341,633 B2    7/2019 Lindner et al.
2003/0214502 A1*  11/2003 Park ................... G06T 15/405
                                                345/420
(Continued)

FOREIGN PATENT DOCUMENTS

WO    2019168264 A1    9/2019

OTHER PUBLICATIONS

Barron et al., "The Fast Bilateral Solver," 14th European Conference on Computer Vision (ECCV), 2016, 50 pages.
(Continued)

*Primary Examiner* — Jiangeng Sun

(57) ABSTRACT

A method includes obtaining, using at least one processor, first and second input image frames, where the first and second input image frames are associated with first and second image planes, respectively. The method also includes obtaining, using the at least one processor, a depth map associated with the first input image frame. The method further includes producing another version of the depth map by performing one or more times: (a) projecting, using the at least one processor, the first input image frame to the second image plane in order to produce a projected image frame using (i) the depth map and (ii) information identifying a conversion from the first image plane to the second image plane and (b) adjusting, using the at least one processor, at least one of the depth map and the information identifying the conversion from the first image plane to the second image plane.

20 Claims, 7 Drawing Sheets

(51) Int. Cl.
*G06T 5/00* (2006.01)
*G06T 5/50* (2006.01)
*H04N 13/00* (2018.01)

(52) U.S. Cl.
CPC ...... *G06T 5/50* (2013.01); *G06T 2207/10012* (2013.01); *G06T 2207/20081* (2013.01); *H04N 2013/0081* (2013.01)

(56) References Cited

U.S. PATENT DOCUMENTS

| | | | | |
|---|---|---|---|---|
| 2006/0028473 | A1* | 2/2006 | Uyttendaele | G06T 15/205 345/473 |
| 2008/0150945 | A1* | 6/2008 | Wang | G06K 9/20 345/427 |
| 2009/0315982 | A1* | 12/2009 | Schmidt | H04N 13/395 348/47 |
| 2011/0069064 | A1* | 3/2011 | Zhang | G06T 7/593 345/419 |
| 2012/0162193 | A1* | 6/2012 | Bae | G06T 5/005 345/419 |
| 2012/0176381 | A1* | 7/2012 | Park | G06T 17/005 345/424 |
| 2014/0204088 | A1* | 7/2014 | Kirk | G06T 9/00 345/427 |
| 2014/0307953 | A1* | 10/2014 | Kirk | H04N 13/271 382/154 |
| 2014/0341289 | A1* | 11/2014 | Schwarz | H04N 13/128 375/240.16 |
| 2014/0341292 | A1* | 11/2014 | Schwarz | H04N 13/128 375/240.16 |
| 2015/0237325 | A1* | 8/2015 | Angot | G06T 7/579 348/47 |
| 2015/0237329 | A1 | 8/2015 | Venkataraman et al. | |
| 2015/0341614 | A1* | 11/2015 | Senoh | H04N 13/161 348/43 |
| 2016/0328828 | A1 | 11/2016 | Zhang et al. | |
| 2016/0335491 | A1* | 11/2016 | Wang | G06K 9/00369 |
| 2017/0316602 | A1 | 11/2017 | Smirnov et al. | |
| 2017/0366795 | A1* | 12/2017 | Chou | H04N 13/128 |
| 2018/0059679 | A1* | 3/2018 | Taimouri | G06T 7/50 |
| 2018/0176530 | A1 | 6/2018 | Shintani et al. | |
| 2018/0322708 | A1* | 11/2018 | Luccin | G02B 27/0172 |
| 2019/0004535 | A1* | 1/2019 | Huang | G05D 1/0251 |
| 2019/0045173 | A1* | 2/2019 | Hicks | G01B 11/2513 |
| 2019/0079158 | A1* | 3/2019 | Karafin | G06T 7/11 |
| 2019/0342541 | A1* | 11/2019 | Bai | H04N 13/161 |
| 2019/0342542 | A1* | 11/2019 | Bai | H04N 7/147 |
| 2019/0356905 | A1 | 11/2019 | Godard et al. | |
| 2020/0211206 | A1* | 7/2020 | Wang | G06N 20/00 |
| 2020/0372710 | A1* | 11/2020 | Wang | B29C 64/386 |
| 2020/0402251 | A1 | 12/2020 | Ban et al. | |
| 2021/0133994 | A1* | 5/2021 | Valli | H04N 13/344 |
| 2021/0183089 | A1* | 6/2021 | Wadhwa | G01S 11/12 |
| 2021/0201575 | A1* | 7/2021 | Arora | G06T 7/55 |

OTHER PUBLICATIONS

Gonzalez et al., "Finding Correspondences for Optical Flow and Disparity Estimations using a Sub-pixel Convolution-based Encoder-Decoder Network," arXiv:1810.03155, Oct. 2018, 16 pages.

Gu et al., "Learning Dynamic Guidance for Depth Image Enhancement," 2017 IEEE Conference on Computer Vision and Pattern Recognition (CVPR), 2017, 10 pages.

He et al., "Guided Image Filtering," IEEE Transactions on Pattern Analysis and Machine Intelligence, vol. 35, No. 6, Jun. 2013, pp. 1397-1409.

Hui et al., "Depth Map Super-Resolution by Deep Multi-Scale Guidance," 14th European Conference on Computer Vision (ECCV), 2016, 17 pages.

Levoy, "Portrait mode on the Pixel 2 and Pixel 2 XL smartphones," Google Al Blog, Oct. 2017, 16 pages.

Wadhwa et al., "Synthetic Depth-of-Field with a Single-Camera Mobile Phone," ACM Trans. Graph., vol. 37, No. 4, Article 64, Aug. 2018, 18 pages.

Wikipedia, "Bokeh," Oct. 2018, 9 pages.

Wikipedia, "Nearest-neighbor interpolation," Feb. 2017, 2 pages.

Xu et al., "Depth-Aware Motion Deblurring," 2012 IEEE International Conference on Computational Photography (ICCP), 2012, 8 pages.

Yue et al., "High-Dimensional Camera Shake Removal With Given Depth Map," IEEE Transactions on Image Processing, vol. 23, No. 6, Jun. 2014, 16 pages.

Zhen et al., "Motion Deblurring and Depth Estimation from Multiple Images," 2016 IEEE International Conference on Image Processing (ICIP), 2016, 5 pages.

Zhou et al., "Stereo Magnification: Learning view synthesis using multiplane images," ACM Trans. Graph., vol. 37, No. 4, Article 65, Aug. 2018, 12 pages.

International Search Report and Written Opinion of the International Searching Authority dated Jun. 10, 2021 in connection with International Application No. PCT/KR2021/002760, 8 pages.

* cited by examiner

SUPER-RESOLUTION DEPTH MAP GENERATION FOR MULTI-CAMERA OR OTHER ENVIRONMENTS

TECHNICAL FIELD

This disclosure relates generally to imaging systems. More specifically, this disclosure relates to super-resolution depth map generation for multi-camera or other environments.

BACKGROUND

Many mobile electronic devices, such as smartphones and tablet computers, include cameras that can be used to capture still and video images. In many of these mobile electronic devices, various image processing operations can be performed using captured images of a scene based on different estimated depths within the scene. For example, "bokeh" refers to an effect that helps to improve the aesthetic quality of an image by blurring out-of-focus portions of the image (such as a background of the image) while keeping other portions of the image (such as a foreground or one or more subjects) in focus. In digital single-lens reflex (DSLR) cameras or other high-end cameras, bokeh is created optically in captured images due to the design and operation of the cameras and their associated lenses. However, in mobile electronic devices like smartphones and tablet computers, bokeh is typically created computationally rather than optically. For instance, a mobile electronic device may estimate various depths in a scene within an image, and bokeh can be created by blurring pixels associated with larger depths more and blurring pixels associated with smaller depths less or not at all.

SUMMARY

This disclosure provides super-resolution depth map generation for multi-camera or other environments.

In a first embodiment, a method includes obtaining, using at least one processor, first and second input image frames, where the first and second input image frames are associated with first and second image planes, respectively. The method also includes obtaining, using the at least one processor, a depth map associated with the first input image frame. The method further includes producing another version of the depth map by performing one or more times: (a) projecting, using the at least one processor, the first input image frame to the second image plane in order to produce a projected image frame using (i) the depth map and (ii) information identifying a conversion from the first image plane to the second image plane and (b) adjusting, using the at least one processor, at least one of the depth map and the information identifying the conversion from the first image plane to the second image plane.

In a second embodiment, an apparatus includes at least one memory configured to store first and second input image frames, where the first and second input image frames are associated with first and second image planes, respectively. The apparatus also includes at least one processor configured to obtain a depth map associated with the first input image frame. The at least one processor is also configured, to produce another version of the depth map, to one or more times: (a) project the first input image frame to the second image plane in order to produce a projected image frame using (i) the depth map and (ii) information identifying a conversion from the first image plane and (b) adjust at least one of the depth map and the information identifying the conversion from the first image plane to the second image plane.

In a third embodiment, a non-transitory computer readable medium contains instructions that when executed cause at least one processor to obtain first and second input image frames, where the first and second input image frames are associated with first and second image planes, respectively. The medium also contains instructions that when executed cause the at least one processor to obtain a depth map associated with the first input image frame. The medium further contains instructions that when executed cause the at least one processor, to produce another version of the depth map, to one or more times: (a) project the first input image frame to the second image plane in order to produce a projected image frame using (i) the depth map and (ii) information identifying a conversion from the first image plane to the second image plane and (ii) adjust at least one of the depth map and the information identifying the conversion from the first image plane to the second image plane.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
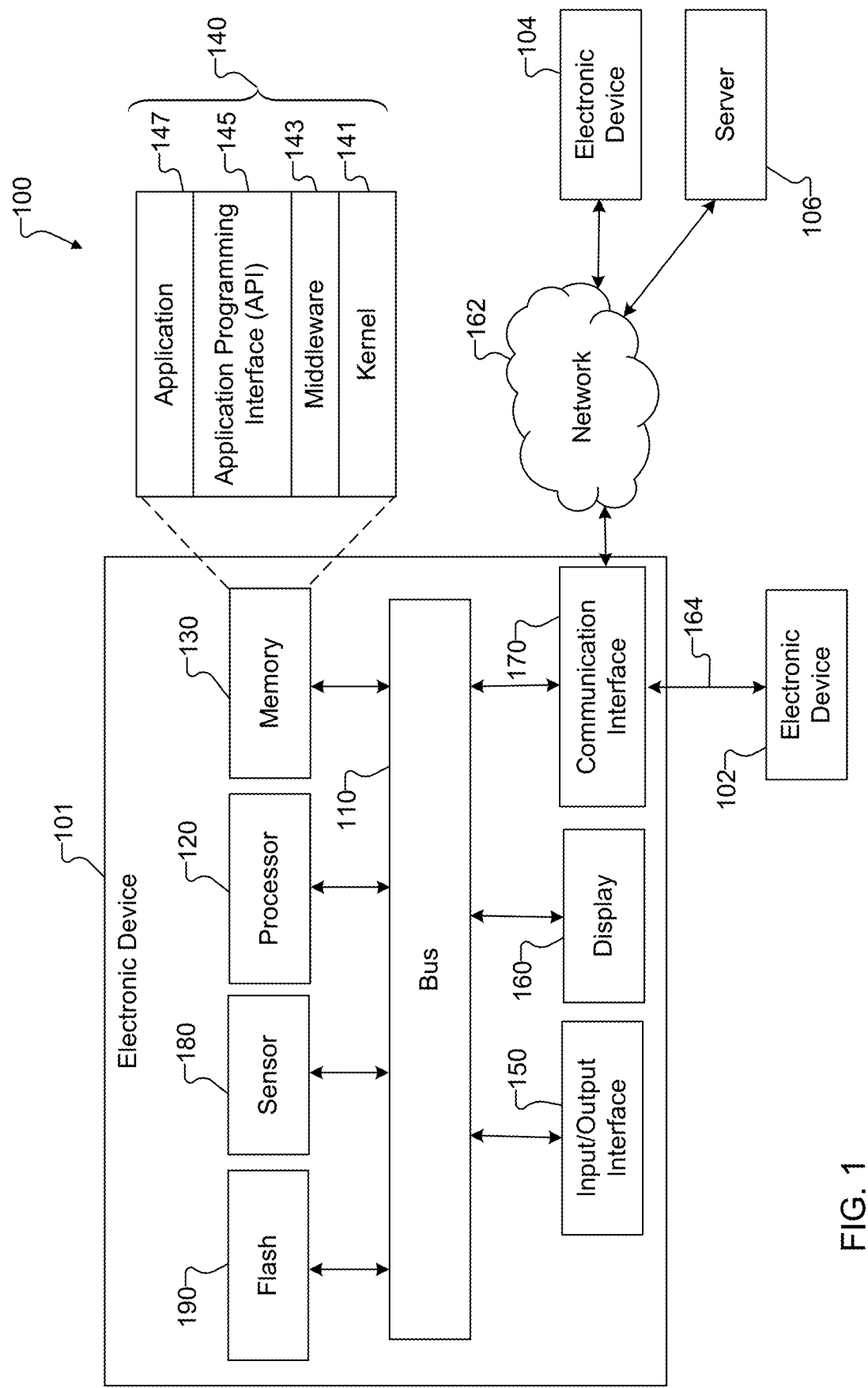
FIG. 1 illustrates an example network configuration including an electronic device in accordance with this disclosure.

FIGS. 1 through 8, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, many mobile electronic devices, such as smartphones and tablet computers, include cameras that can be used to capture still and video images. In many of these mobile electronic devices, various image processing operations can be performed using captured images of a scene based on different estimated depths within the scene. Depths in a scene are often identified and expressed using a depth map. A depth map is typically based on a captured image, where each pixel in the depth map corresponds to and identifies a depth associated with at least one pixel in the captured image. The depth map can be used to perform one or more image processing operations involving the captured image. However, the resolution of images that can be captured using electronic devices is increasing over time. Currently, images can be captured using electronic devices at "4K" resolutions, such as 3840×2160, or even higher. Computing a depth map directly from a high-resolution image is computationally expensive and time consuming. In some cases, it may not even be possible to compute a depth map directly from a high-resolution image, such as due to limitations in computing power or hardware in an electronic device. While it is possible to simply create a lower-resolution depth map and then upsample the lower-resolution depth map to generate a higher-resolution depth map, this approach typically loses quite a bit of detail related to depth in a scene.

This disclosure provides various techniques for generating super-resolution depth maps in multi-camera or other environments. As described in more detail below, a high-resolution depth map is generated using multiple high-resolution input image frames captured by one or more imaging sensors of an electronic device. This generally involves the creation of an initial high-resolution depth map, which is generated using a low-resolution depth map. The initial high-resolution depth map is repeatedly or iteratively refined using an optimization process, which can be implemented in various ways as described below. The optimization process improves the initial high-resolution depth map to produce a final high-resolution depth map for a scene that recovers lost details and corrects for wrong depth values (compared to the original low-resolution depth map).

In this way, it is possible to significantly increase the resolution of a depth map for a scene. As a result, a depth map can be generated with improved accuracy and improved detail compared to simply upconverting a low-resolution depth map. This also enables various image processing operations to obtain more aesthetically-pleasing or accurate results. The generation of high-resolution depth maps can be used in various image processing applications, such as bokeh image generation, depth-aware deblurring, image relighting, augmented reality (AR), mixed reality (MR), visual simultaneous localization and mapping (SLAM), odometry, and animoji-related processes. In addition, the techniques described below can produce high-resolution depth maps in significantly shorter amounts of time and using significantly fewer calculations compared to generating high-resolution depth maps directly from high-resolution input images. Because of this, the techniques described below can be performed much faster in higher-power electronic devices and can be implemented in electronic devices having fewer or lower-power resources (such as slower processors).

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, a sensor 180, and a flash 190. In some embodiments, the electronic device 101 may exclude at least one of these components or may add at least one other component. The bus 110 includes a circuit for connecting the components 120-190 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 may obtain input image frames and perform one or more image processing operations that include the generation or use of one or more high-resolution depth maps.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain input image frames and perform one or more image processing operations, which may include the generation or use of one or more high-resolution depth maps. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101. The one or more cameras or other imaging sensors 180 can optionally be used in conjunction with at least one flash 190. The flash 190 represents a device configured to generate illumination for use in image capture by the electronic device 101, such as one or more LEDs.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 may execute one or more applications that, among other things, obtain input image frames and perform one or more image processing operations, which may include the generation or use of one or more high-resolution depth maps.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

The following describes several example techniques for super-resolution depth map generation in a multi-camera or other environment. Note that these techniques may involve the use of multiple cameras or other imaging sensors 180 or a single camera or other imaging sensor 180. Thus, in some embodiments, multiple cameras or other imaging sensors 180 may be used to capture multiple input image frames (possibly simultaneously). In other embodiments, a single camera or other imaging sensor 180 may be used to capture multiple images in quick succession, where the imaging sensor 180 moves in between image captures. As a result, first and second input image frames described below may be captured by multiple cameras or other imaging sensors 180 or by a single camera or other imaging sensor 180. In either case, the first and second input image frames are associated with different image planes, which refer to the planes of the imaging sensor or sensors 180 at the time or times when the input image frames are captured.

Figure 2:
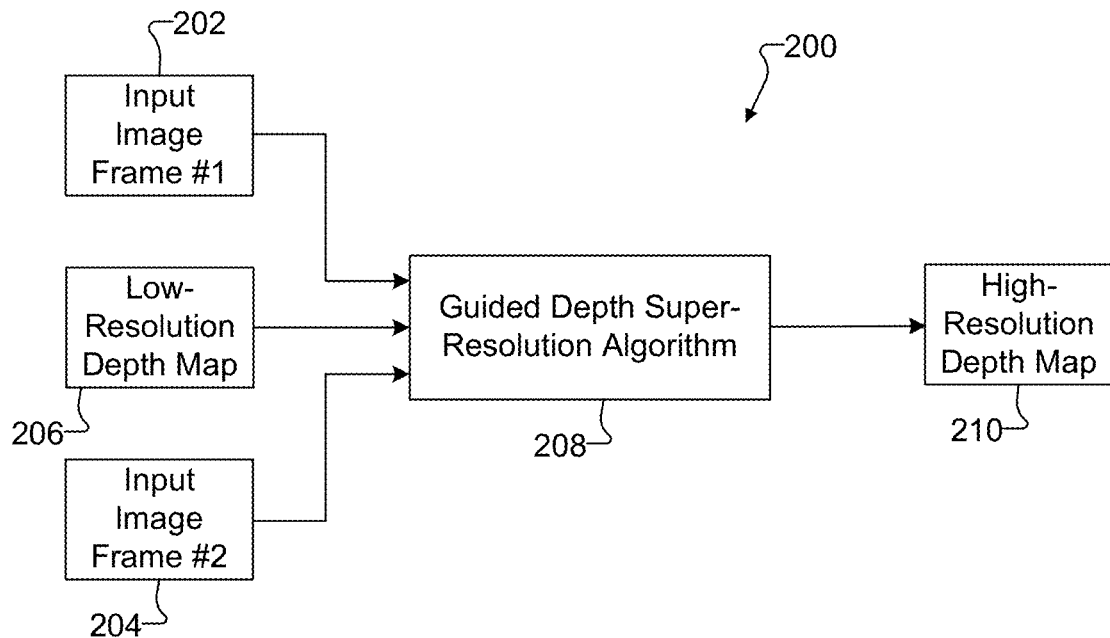
FIGS. 2 and 3 illustrate a first example technique for super-resolution depth map generation in a multi-camera or other environment in accordance with this disclosure.
Figure 3:
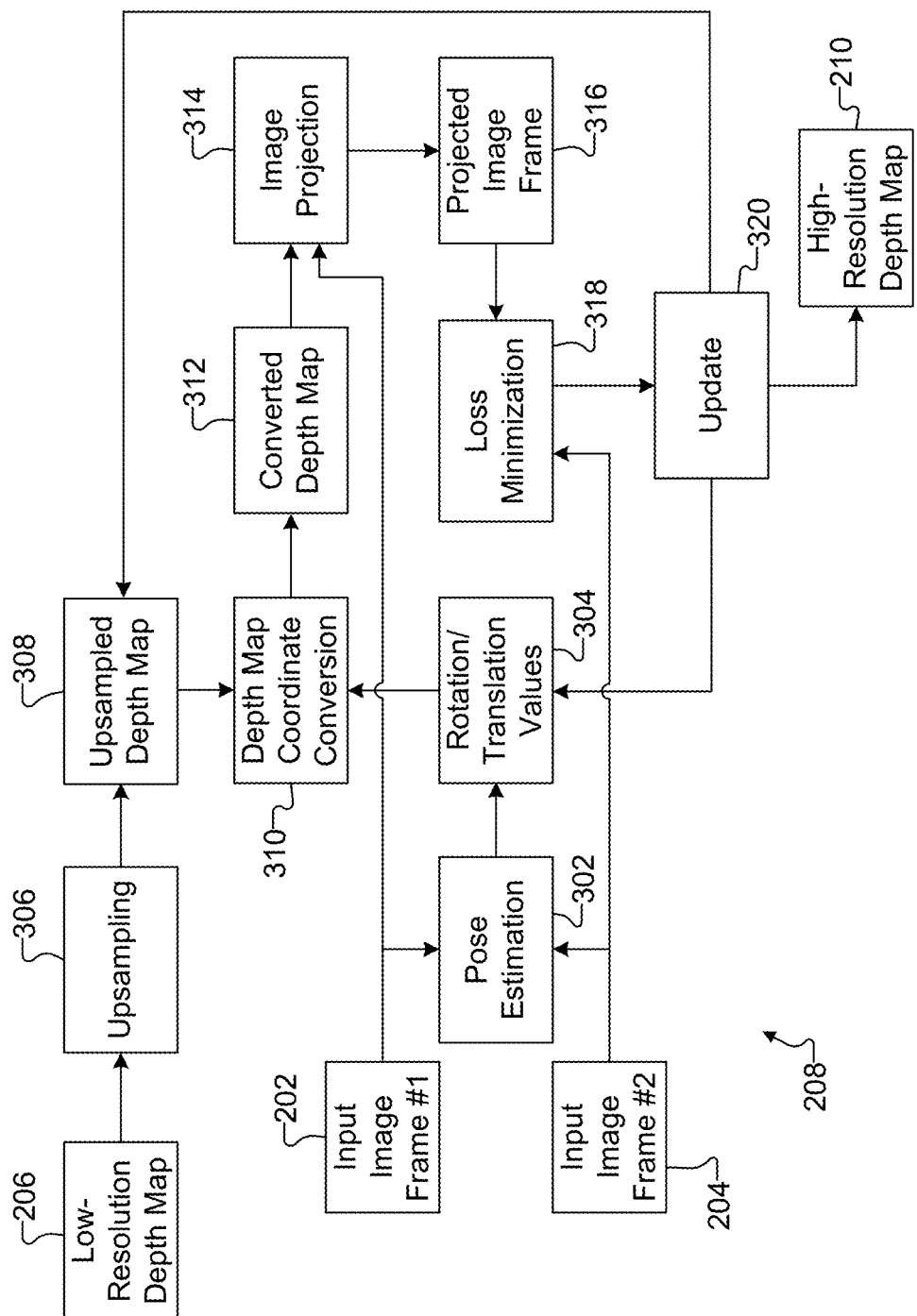

FIGS. 2 and 3 illustrate a first example technique 200 for super-resolution depth map generation in a multi-camera or other environment in accordance with this disclosure. For ease of explanation, the technique 200 shown in FIGS. 2 and 3 is described as involving the use of the electronic device 101 in the network configuration 100 of FIG. 1. However, the technique 200 shown in FIGS. 2 and 3 could be used with any other suitable device and in any other suitable system.

As shown in FIG. 2, multiple input image frames, including first and second input image frames 202 and 204, are captured or otherwise obtained using the electronic device 101. The input image frames 202 and 204 could be captured simultaneously using different cameras or other imaging sensors 180 of the electronic device 101. As a particular example, the input image frames 202 and 204 may be captured simultaneously by a pair of stereo cameras or other stereo imaging sensors 180 of the electronic device 101. As noted above, however, the input image frames 202 and 204 may also be captured sequentially, such as with a single camera or other imaging sensor 180 that moves in between image captures. The input image frames 202 and 204 could be captured in response to a capture event, such as when the processor 120 detects a user initiating image capture by depressing a hard or soft button of the electronic device 101. The input image frames 202 and 204 may have any suitable resolution, such as a 4K resolution of 3840×2160 or higher. The resolution of the input image frames 202 and 204 can depend on the capabilities of the imaging sensor(s) 180 in the electronic device 101 and possibly on one or more user settings affecting the resolution. In some cases, the input image frames 202 and 204 may represent RGB image frames.

A low-resolution depth map 206 is also generated or otherwise obtained by the electronic device 101. The low-resolution depth map 206 represents an initial depth map of a scene captured in at least one of the input image frames 202 and 204. However, the low-resolution depth map 206 has a lower resolution compared to the input image frames 202 and 204. As a particular example, if the input image frames 202 and 204 have a resolution of 3840×2160, the low-resolution depth map 206 may have a resolution of 960×540. The low-resolution depth map 206 can be generated in any suitable manner. In some embodiments, the low-resolution depth map 206 is generated using one of the input image frames 202 and 204. Often times below, it is assumed that the low-resolution depth map 206 is generated using the input image frame 202, although the low-resolution depth map 206 may also be generated using the input image frame 204. Various techniques for generating depth maps for an image are known in the art, and any of these techniques may be used here. In other embodiments, a low-resolution depth map may be generated as described below. Note that any suitable technique may be used here to generate a low-resolution depth map 206, and this disclosure is not limited to any particular technique for generating the low-resolution depth map 206.

The input image frames 202 and 204 and the low-resolution depth map 206 are provided to a guided depth super-resolution (DSR) algorithm 208, which processes this information to produce a high-resolution depth map 210. The high-resolution depth map 210 represents a depth map associated with at least one of the input image frames 202 and 204, and the high-resolution depth map 210 has a higher resolution compared to the low-resolution depth map 206. In some embodiments, for instance, the high-resolution depth map 210 may have a resolution that matches the resolution of the input image frames 202 and 204. As a particular example, if the input image frames 202 and 204 have a resolution of 3840×2160, the high-resolution depth map 210 may have a matching resolution of 3840×2160. In these types of embodiments, each pixel in the high-resolution depth map 210 corresponds to and identifies a depth for a pixel in at least one of the input image frames 202 and 204.

One example implementation of the guided DSR algorithm 208 is shown in FIG. 3. As shown in FIG. 3, the guided DSR algorithm 208 receives the input image frames 202 and 204 and performs a pose estimation function 302. The pose estimation function 302 operates to determine the differences in pose between the image planes used by the one or more cameras or other imaging sensors 180 when capturing the input image frames 202 and 204. The pose estimation function 302 generates information identifying a conversion from the image plane of the input image frame 202 to the image plane of the input image frame 204. Here, this information includes rotation and translation values 304, which define how the image planes for the input image frames 202 and 204 differ. For example, if the input image frames 202 and 204 are captured simultaneously by different cameras or other imaging sensors 180, the rotation and translation values 304 can be based on the different image planes of the imaging sensors 180 at the time of image capture. If the input image frames 202 and 204 are captured sequentially by a single camera or other imaging sensor 180, the rotation and translation values 304 can be based on the different image planes of the imaging sensor 180 at the different times of image capture. Translation generally refers to differences between image planes in specified directions, such as along first and second orthogonal axes. Rotation generally refers to differences between image planes rotationally about a third axis, which can be orthogonal to the first and second axes.

Various techniques are known in the art for identifying rotational and translational differences between image planes, such as structure from motion techniques. As a particular example, the processor 120 of the electronic device 101 may identify n pairs of sparse points in the input image frames 202 and 204, where n is at least eight. The sparse points can be expressed as $p_{1...n}^1$, $p_{1...n}^2$, where $p^1$ represents the first input image frame's sparse points and $p^2$ represents the second input image frame's sparse points. The processor 120 of the electronic device 101 may then calculate the rotation R and translation T values by solving $p^1[T] \times Rp^2 = 0$. Note that any suitable technique may be used here to perform pose estimation and generate rotation and translation values 304, and this disclosure is not limited to any particular technique for generating the rotation and translation values 304. The rotation and translation values 304 may be denoted as $R_1^2$ and $T_1^2$, respectively.

An upsampling function 306 receives the low-resolution depth map 206 and produces a higher-resolution or upsampled depth map 308, which is initially referred to as a coarse depth map. The depth map 308 can have the same resolution as the input image frames 202 and 204, such as a 4K resolution or other resolution. However, because the depth map 308 is produced by upsampling the low-resolution depth map 206, the depth map 308 initially lacks fine detail compared to the input image frames 202 and 204, which is why the depth map 308 may initially referred to as a coarse depth map. Various techniques are known in the art for upsampling image data, such as a nearest-neighbor upsampling technique. Note that any suitable technique may be used here to perform upsampling and generate an upsampled depth map 308, and this disclosure is not limited to any particular technique for generating the upsampled depth map 308. The depth map 308 may be denoted as $\hat{D}_1$. As described above, in some embodiments, the low-resolution depth map 206 may be generated using the input image frame 202, in which case the upsampled depth map 308 may be associated with or based on the input image frame 202 (and is therefore associated with the image plane used to capture the input image frame 202).

A depth map coordinate conversion function 310 receives the depth map 308 and the rotation and translation values 304. The depth map coordinate conversion function 310 generally operates to convert the depth map 308 from the coordinate frame of the input image frame 202 into the coordinate frame of the input image frame 204, thereby producing a converted depth map 312. In other words, the depth map coordinate conversion function 310 converts the depth map 308 from the image plane used to capture the input image frame 202 to the image plane used to capture the input image frame 204 based on the rotation and translation values 304. For example, the depth map coordinate conversion function 310 may identify a point cloud from the depth map 308, where the point cloud includes a large number of specified points in the depth map 308. The depth map coordinate conversion function 310 may apply the rotation and translation values 304 to the identified point cloud in order to identify corresponding points in the converted depth map 312. Note that any suitable number of points may be identified in the point cloud and processed using the rotation and translation values 304 to produce the converted depth map 312. The converted depth map 312 may be denoted as Di.

An image projection function 314 uses the converted depth map 312 to project the first input image frame 202 to the image plane associated with the second input image frame 204. For example, the image projection function 314 can use the converted depth map 312 to project the first input image frame 202 captured by one camera or other imaging sensor 180 to the image plane associated with another camera or other imaging sensor 180. As another example, the image projection function 314 can use the converted depth map 312 to project the first input image frame 202 captured by a camera or other imaging sensor 180 at one time to the image plane associated with the same camera or other imaging sensor 180 at a different time. The result of the image projection function 314 is a projected version of the input image frame 202, which is referred to as a projected image frame 316. The projected image frame 316 represents an estimate of what the first input image frame 202 might look like had the first input image frame 202 been captured at the image plane used to capture the second input image frame 204, which is based on the current version of the depth map 308. The projected image frame 316 may be denoted as $\hat{I}_2$.

At this point, the projected image frame 316 may be similar, but not an exact match, to the second input image frame 204. Among other things, this is due to the fact that the projected image frame 316 is generated using the initial depth map 308 and the initial rotation and translation values 304, which may be coarse values. In FIG. 3, the match between the second input image frame 204 and the projected image frame 316 is improved by iteratively making adjustments to the depth map 308 and/or the rotation and translation values 304. Thus, in FIG. 3, the projected image frame 316 and the second input image frame 204 are provided to a loss minimization function 318, which generally operates to minimize a loss function in order to update the depth map 308 and/or the rotation and translation values 304.

Any suitable loss function may be used here to help close the gap between the second input image frame 204 and the projected image frame 316. In some embodiments, the loss minimization function 318 uses a loss function that is based on a combination of three factors, namely (i) a measure of photometric loss between the second input image frame 204 and the projected image frame 316, (ii) a measure of total variance in the depth map 308, and (iii) a measure of errors between edges identified in the first input image frame 202 and edges identified in the depth map 308. In particular embodiments, the loss minimization function 318 may use the following loss function:

$$\min_{\hat{D}_1, R_1^2, T_1^2} \left\| I_2 - \hat{I}_2(\hat{D}_1, R_1^2, T_1^2) \right\|_2 + Tv(\hat{D}_1) + \left\| \Delta I_1 - \Delta \hat{D}_1 \right\|_2 \quad (1)$$

Here, $I_2$ represents the second input image frame 204, and the projected image frame $\hat{I}_2$ is shown here as being a function of the depth map $\hat{D}_1$ and the rotation and translation values $R_1^2$ and $T_1^2$. Also, $\Delta I_1$ represents edges contained in the first input image frame 202, and $\Delta \hat{D}_1$ represents edges contained in the depth map 308. The expression $\|I_2-\hat{I}_2(\hat{D}_1, R_1^2, T_1^2)\|_2$ here defines the photometric loss between the second input image frame 204 and the projected image frame 316. The expression $Tv(\hat{D}_1)$ here defines the total variance of the depth map $\hat{D}_1$. The expression $\|\Delta I_1-\Delta \hat{D}_1\|_2$ here defines the error between the edges identified in the first input image frame 202 and the depth map 308.

An update function 320 can be used to update the depth map 308 and/or the rotation and translation values 304 based on the results of the loss minimization function 318, thereby feeding back an updated depth map 308 and/or updated rotation and translation values 304. The updated depth map 308 and/or the updated rotation and translation values 304 may then be used by the depth map coordinate conversion function 310 to generate another converted depth map 312, which can be used by the image projection function 314 to produce an updated projected image frame 316. The updated projected image frame 316 can be processed again by the loss minimization function 318, and additional updates to the depth map 308 and/or the rotation and translation values 304 may be made. This iterative process can continue until at least one specified condition is met, such as the measured loss being below a specified threshold value or a specified number of iterations being completed. In some cases, it may typically take between three and five iterations of this process for the measured loss to fall below the specified threshold value. Also, in some cases, the specified number of iterations may be based on the expected maximum number of iterations that might typically occur during use.

The iterations here help to refine the original version of the depth map 308 by adding additional details into the depth map 308 over multiple iterations. This essentially helps to recover lost details, since the original version of the depth map 308 is based on an upsampled low-resolution depth map 206 that lacks fine details. Moreover, this helps to correct for wrong depth values that might have been contained in the original depth map 206 or 308. Once the iterations end, the high-resolution depth map 210 can be output, where the high-resolution depth map 210 represents the final updated version of the depth map 308. In this example, the high-resolution depth map 210 is shown as being output from the update function 320, although the high-resolution depth map 210 may be provided by any other suitable component (such as a memory used to store the final updated version of the depth map 308).

The process shown here can produce a high-resolution depth map 210 in significantly shorter amounts of time and using significantly fewer calculations compared to calculating the high-resolution depth map 210 directly from a high-resolution input image frame 202 or 204. For example, using a direct approach from a 4K image frame, it may take approximately one billion multiply-accumulate operations over a period of about twelve seconds to generate a 4K depth map from the 4K image frame. Using the approach described above with respect to FIGS. 2 and 3, it may take approximately one hundred million multiply-accumulate operations over less than two seconds to generate a high-resolution depth map 210. For electronic devices like mobile smartphones and tablet computers, this reduction in time can be very significant, especially in terms of user satisfaction.

The approach shown here is essentially supporting a depth-wise continuous and spatially discontinuous technique for multiplane guidance in determining depth. Here, the two original input image frames 202 and 204 are used as guidance images and help guide the generation of the high-resolution depth map 210. Moreover, the guidance used here can be independent of image intensity in the input image frames 202 and 204, which helps to avoid problems such as contrast-based depth-discontinuities. In addition, multiplane considerations can be taken into account here based solely on depth changes to help preserve edges in the high-resolution depth map 210.

Although FIGS. 2 and 3 illustrate a first example of a technique 200 for super-resolution depth map generation in a multi-camera or other environment, various changes may be made to FIGS. 2 and 3. For example, more than two input image frames may be received and processed. Also, the high-resolution depth map 210 that is generated here may be used in any number of image processing applications.

Figure 4:
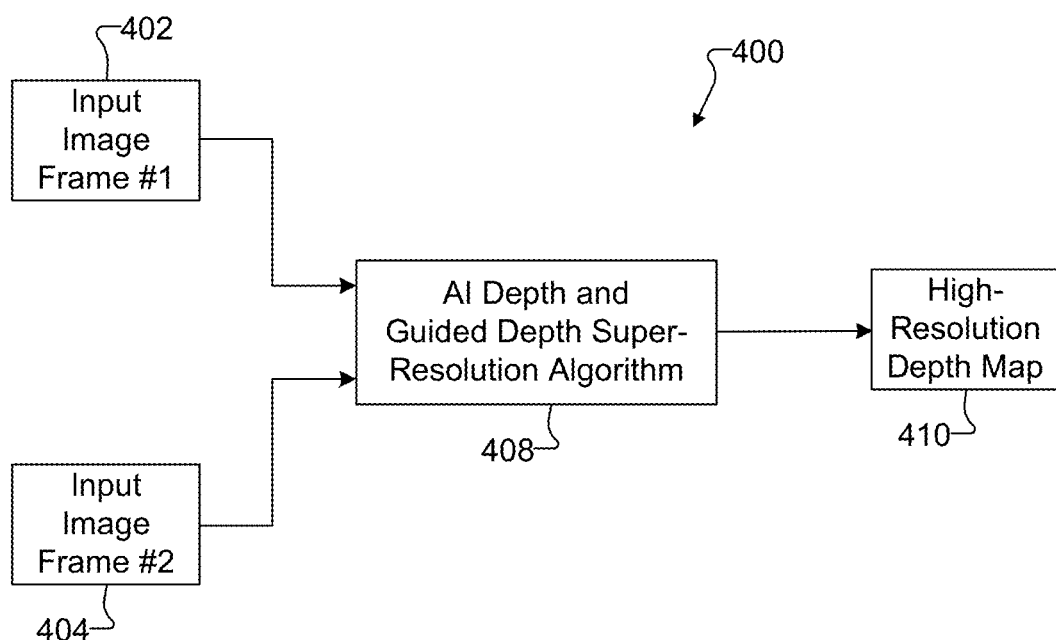
FIGS. 4, 5, and 6 illustrate a second example technique for super-resolution depth map generation in a multi-camera or other environment in accordance with this disclosure.
Figure 5:
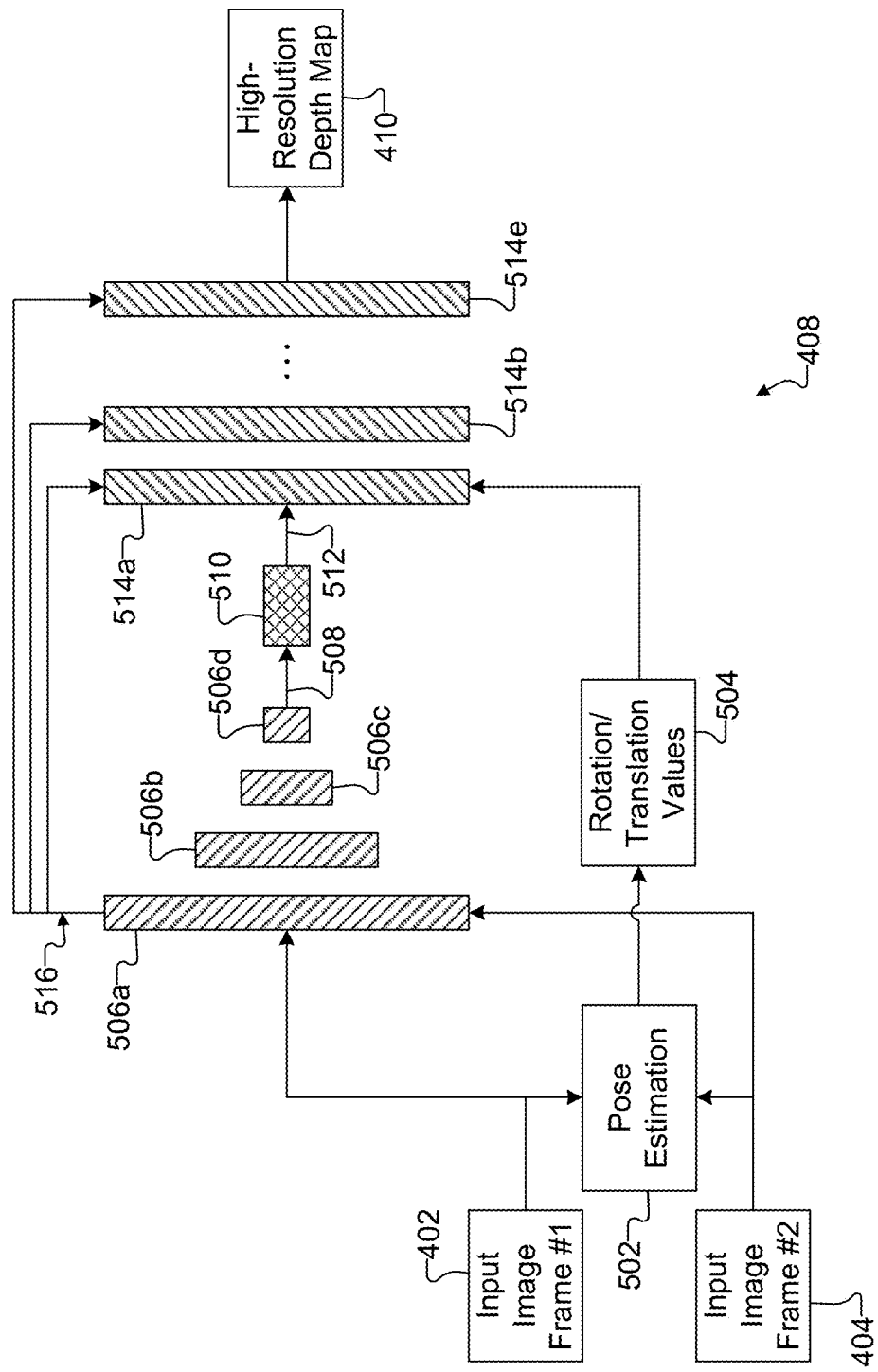
Figure 6:
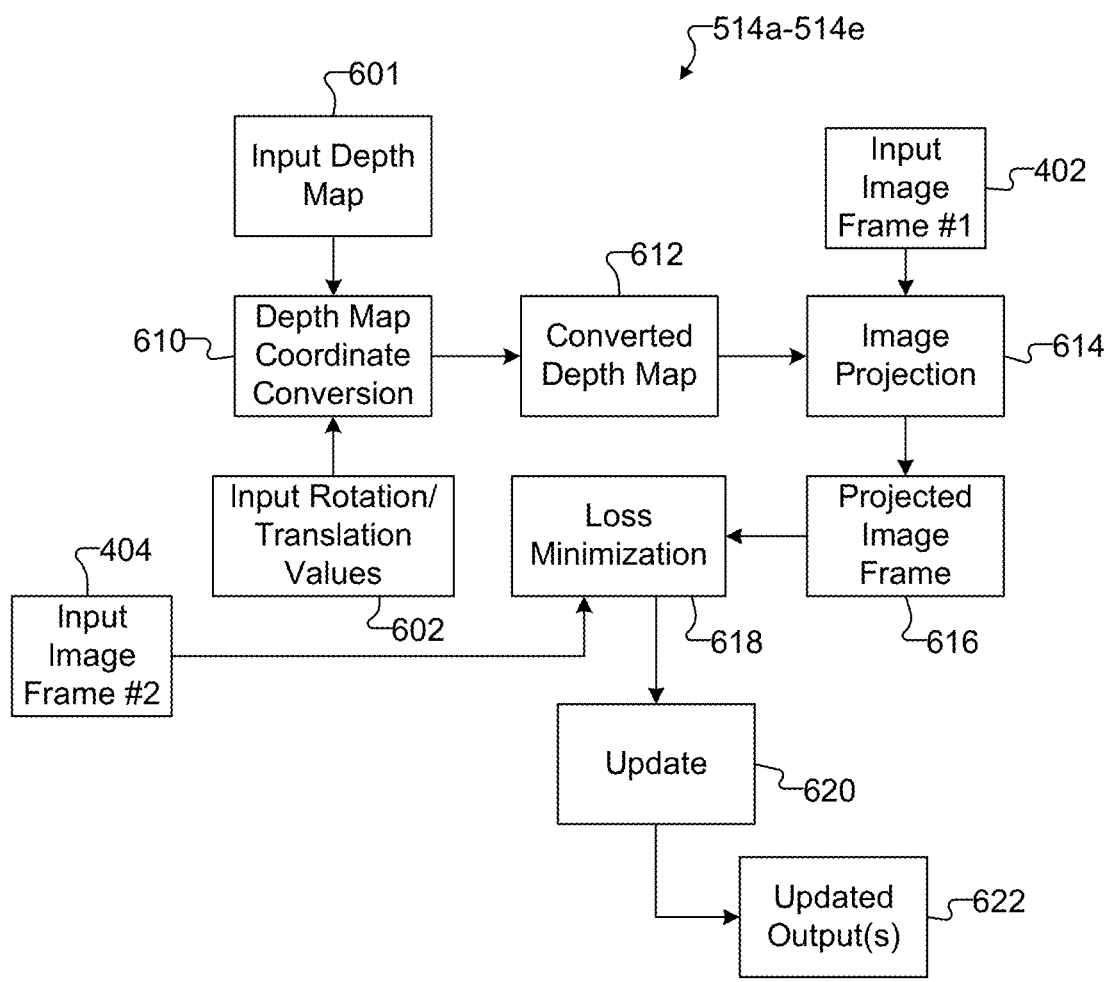

FIGS. 4, 5, and 6 illustrate a second example technique 400 for super-resolution depth map generation in a multi-camera or other environment in accordance with this disclosure. For ease of explanation, the technique 400 shown in FIGS. 4, 5, and 6 is described as involving the use of the electronic device 101 in the network configuration 100 of FIG. 1. However, the technique 400 shown in FIGS. 4, 5, and 6 could be used with any other suitable device and in any other suitable system.

As shown in FIG. 4, multiple input image frames, including first and second input image frames 402 and 404, are captured or otherwise obtained using the electronic device 101. The input image frames 402 and 404 could be captured simultaneously using different cameras or other imaging sensors 180 of the electronic device 101, such as by a pair of stereo cameras or other stereo imaging sensors 180 of the electronic device 101. As noted above, however, the input image frames 402 and 404 may also be captured sequentially, such as with a single camera or other imaging sensor 180 that moves in between image captures. The input image frames 402 and 404 could be captured in response to a capture event, such as when the processor 120 detects a user initiating image capture by depressing a hard or soft button of the electronic device 101. The input image frames 402 and 404 may have any suitable resolution, such as a 4K resolution of 3840×2160 or higher. The resolution of the input image frames 402 and 404 can depend on the capabilities of the imaging sensor(s) 180 in the electronic device 101 and possibly on one or more user settings affecting the resolution. In some cases, the input image frames 402 and 404 may represent RGB image frames.

The input image frames 402 and 404 are provided to a machine learning or artificial intelligence (AI) depth and guided DSR algorithm 408. The AI depth and guided DSR algorithm 408 uses at least one of the input image frames 402 and 404 to produce a low-resolution depth map. The AI depth and guided DSR algorithm 408 also uses the low-resolution depth map and the input image frames 402 and 404 to produce a high-resolution depth map 410. Thus, unlike in FIG. 2 where the low-resolution depth map 206 is obtained in some unspecified manner, the low-resolution depth map in FIG. 4 is produced as part of the processing of the input image frames 402 and 404. The approach in FIG. 4 therefore allows a machine learning algorithm to be trained to generate the low-resolution depth map, along with being trained to generate the high-resolution depth map 410. The low-resolution depth map here represents an initial depth map of a scene captured in the input image frames 402 and 404, but the low-resolution depth map has a lower resolution compared to the input image frames 402 and 404. As a particular example, if the input image frames 402 and 404 have a resolution of 3840×2160, the low-resolution depth map may have a resolution of 960×540. The low-resolution depth map may be generated as described below with respect to FIG. 5.

The high-resolution depth map 410 represents a depth map associated with at least one of the input image frames 402 and 404, and the high-resolution depth map 410 has a higher resolution compared to the low-resolution depth map. In some embodiments, for instance, the high-resolution depth map 410 may have a resolution that matches the resolution of the input image frames 402 and 404. As a particular example, if the input image frames 402 and 404 have a resolution of 3840×2160, the high-resolution depth map 410 may have a matching resolution of 3840×2160. In these types of embodiments, each pixel in the high-resolution depth map 410 corresponds to and identifies a depth for a pixel in at least one of the input image frames 402 and 404.

One example implementation of the AI depth and guided DSR algorithm 408 is shown in FIG. 5. As shown in FIG. 5, the AI depth and guided DSR algorithm 408 receives the input image frames 402 and 404 and performs a pose estimation function 502. The pose estimation function 502 may be the same as or similar to the pose estimation function 302 described above. The pose estimation function 502 generates rotation and translation values 504, which define how the image planes for the input image frames 402 and 404 differ.

A collection of convolutional layers 506a-506d are also used to process the input image frames 402 and 404. Each convolutional layer 506a-506d applies a convolution function to its inputs in order to generate its outputs. A convolutional layer 506a-506d generally represents a layer of convolutional neurons, which apply a convolution function that emulates the response of individual neurons to visual stimuli. Each neuron typically applies some function to its input values (often by weighting different input values differently) to generate output values. A convolutional layer 506a-506d may be associated with an activation function, which can apply a specific function or operation to the output values from the neurons to produce final outputs of the convolutional layer. In this example, the first convolutional layer 506a receives and processes the input image frames 402 and 404, and each of the remaining convolutional layers 506b-506d receives and processes the outputs from the prior convolutional layer 506a-506c. The output of each convolutional layer 506a-506d has a lower resolution than its input. The output of the last convolutional layer 506d represents a low-resolution depth map 508. Note that while four convolutional layers 506a-506d are shown here as being used to produce the low-resolution depth map 508, the AI depth and guided DSR algorithm 408 may support any suitable number of convolutional layers.

An upsampling layer 510 receives the low-resolution depth map 508 from the convolutional layer 506d and produces a higher-resolution or upsampled depth map 512, which is initially referred to as a coarse depth map. The depth map 512 can have the same resolution as the input image frames 402 and 404, such as a 4K resolution or other resolution. However, because the depth map 512 is produced by upsampling the low-resolution depth map 508, the depth map 512 initially lacks fine detail compared to the input image frames 402 and 404, which is why the depth map 512 may initially referred to as a coarse depth map. Note that any suitable technique may be used here to perform upsampling and generate an upsampled depth map 512 (such as a nearest-neighbor upsampling technique), and this disclosure is not limited to any particular technique for generating the upsampled depth map 512.

The depth map 512 is provided to a collection of DSR layers 514a-514e, which implement the remaining functions of the guided depth super-resolution algorithm. For example, the DSR layers 514a-514e can repeatedly refine the upsampled depth map 512 in order to produce the high-resolution depth map 410. Note that the AI depth and guided DSR algorithm 408 may support any suitable number of DSR layers. In some embodiments, the AI depth and guided DSR algorithm 408 may include between three and five DSR layers, although other numbers of DSR layers may be used. Feed-forward paths 516 here may be used to provide information, such as the input image frames 402 and 404, from the convolutional layer 506a to the DSR layers 514a-514e.

One example implementation of each DSR layer 514a-514e is shown in FIG. 6. As shown in FIG. 6, each DSR layer 514a-514e receives an input depth map 601. In the first DSR layer 514a, the input depth map 601 may represent the upsampled depth map 512 generated by the upsampling layer 510. In each subsequent DSR layer 514b-514e, the input depth map 601 may represent an updated depth map produced by the previous DSR layer. Each DSR layer 514a-514e also receives input rotation and translation values 602. In the first DSR layer 514a, the input rotation and translation values 602 may represent the rotation and translation values 504 generated by the pose function 502. In each subsequent DSR layer 514b-514e, the input rotation and translation values 602 may represent updated rotation and translation values produced by the previous DSR layer.

The input depth map 601 and the input rotation and translation values 602 are used by a depth map coordinate conversion function 610 to convert the depth map 601 from the coordinate frame of the input image frame 402 into the coordinate frame of the input image frame 404, thereby producing a converted depth map 612. An image projection function 614 uses the converted depth map 612 to project the first input image frame 402 to the image plane associated with the second input image frame 404. The result of the image projection function 614 is a projected version of the input image frame 402, which is referred to as a projected image frame 616. The projected image frame 616 and the second input image frame 404 are provided to a loss minimization function 618, which generally operates to minimize a loss function in order to update the depth map 601 and/or the rotation and translation values 602. Any suitable loss function may be used here to help close the gap between the second input image frame 404 and the projected image frame 616, such as the loss functions described above (like the loss function in Equation (1)). An update function 620 can be used to update the depth map 601 and/or the rotation and translation values 602 based on the results of the loss minimization function 618, and the updated depth map 601 and/or the updated rotation and translation values 602 may be provided as one or more updated outputs 622. In each DSR layer except the last DSR layer 514e, the updated outputs 622 may include an updated depth map 601 and/or updated rotation and translation values 602 to be used by the next DSR layer. In the last DSR layer 514e, the updated outputs 622 include the high-resolution depth map 410. The functions 610, 614, 618, and 620 here may be the same as or similar to the functions 310, 314, 318, and 320 described above.

As can be seen in FIGS. 5 and 6, the DSR layers 514a-514e are essentially concatenated layers that operate in series to achieve repeated depth map optimization. Thus, the DSR layers 514a-514e here implement the iterative functionality described above with respect to the guided DSR algorithm 208 shown in FIG. 3, but the optimization is occurring in FIGS. 5 and 6 using concatenated DSR layers (instead of an iterative loop as in FIG. 3). The approach in FIGS. 5 and 6 still allows a desired optimization to occur, thereby achieving high-resolution depth map generation.

The various layers 506a-506d, 510, 514-514e of the AI depth and guided DSR algorithm 408 represent machine learning or AI layers and can therefore be trained using any suitable machine learning technique. For example, in some embodiments, the AI depth and guided DSR algorithm 408 can be provided with training images (such as computer-generated images) in which the actual depths in the imaged scenes are known. The AI depth and guided DSR algorithm 408 generates high-resolution depth maps 410 for the training images, and the generated depth maps 410 can be compared against the known depths associated with the training images in order to identify errors in the calculated depth maps 410. The errors can be back-propagated through the AI depth and guided DSR algorithm 408 in order to adjust weights or other parameters used in one or more of the layers 506a-506d, 510, 514-514e. This process can continue until the layers 506a-506d, 510, 514-514e in the AI depth and guided DSR algorithm 408 have been trained to identify the known depths in the training images (at least to within some threshold or desired amount of accuracy). Note, however, that this disclosure is not limited to any particular machine learning training technique.

Although FIGS. 4, 5, and 6 illustrate a second example of a technique 400 for super-resolution depth map generation in a multi-camera or other environment, various changes may be made to FIGS. 4, 5, and 6. For example, more than two input image frames may be received and processed. Also, the high-resolution depth map 410 that is generated here may be used in any number of image processing applications.

It should be noted that the operations shown in FIGS. 2 through 6 can be implemented in an electronic device 101, 102, 104, server 106, or other device in any suitable manner. For example, in some embodiments, the operations shown in at least some of FIGS. 2 through 6 can be implemented or supported using one or more software applications or other software instructions that are executed by at least one processor 120 of a device. In other embodiments, at least some of the operations shown in at least some of FIGS. 2 through 6 can be implemented or supported using dedicated hardware components. In general, the operations shown in at least some of FIGS. 2 through 6 can be performed using any suitable hardware or any suitable combination of hardware and software/firmware instructions.

It should also be noted that the operations shown in FIGS. 2 through 6 are described above as being performed using a specific implementation of the electronic device 101, but a number of modifications can be made based on the device being used. For example, while the electronic device 101 may be described above as performing various operations using RGB image frames, image data in other domains (such as Bayer or YUV data) could also be used or processed. As another example, the techniques described in this patent document could be combined with any other suitable image processing functionality in order to perform desired processing of still image data, video image data, or other data.

The functionality for generating high-resolution depth maps may be used in any suitable applications. While the following examples describe various ways in which high-resolution depth maps may be used to support other functions, high-resolution depth maps may be used in any other suitable manner. As one example, a high-resolution depth map may be generated and used to create the bokeh effect in a captured image frame. Here, a processor 120 may apply different amounts of blurring to different pixels in the captured image frame, where the different amounts of blurring depend at least partially on the identified depths in the high-resolution depth map (typically where more blurring is applied to larger depths and less/no blurring is applied to smaller depths). The ability to obtain a high-resolution depth map can help the blurring to be applied more accurately in an image frame, enabling more accurate bokeh in the final image of a scene.

As another example, a high-resolution depth map may be generated and used to support depth-aware deblurring. Here, multiple shorter-exposure image frames (with little or no motion blur) and a longer-exposure image frame (with more motion blur) may be captured, and a high-resolution depth map may be generated using at least one of the shorter-exposure image frames. Depth-aware motion blur removal can then be performed using the high-resolution depth map and the longer-exposure image frame, such as by using spatially-varying point spread functions associated with different portions of the longer-exposure image frame having different depths. The ability to obtain a high-resolution depth map can help the depth-aware deblurring to be applied more accurately, enabling more accurate deblurring in the final image of a scene.

As yet another example, a high-resolution depth map may be generated and used to support image relighting. Here, a high-resolution depth map can be generated for an image frame, and the high-resolution depth map can be used to control how lighting in the image frame is modified in the foreground and in the background. The ability to obtain a high-resolution depth map can help the relighting to be applied more accurately, enabling more accurate relighting of the foreground and background in the final image of a scene. As still other examples, various functions involving AR/MR, visual SLAM, odometry, or animoji-related processes may be based on depth in a scene and can benefit from the use of accurate high-resolution depth maps.

Figure 7A:
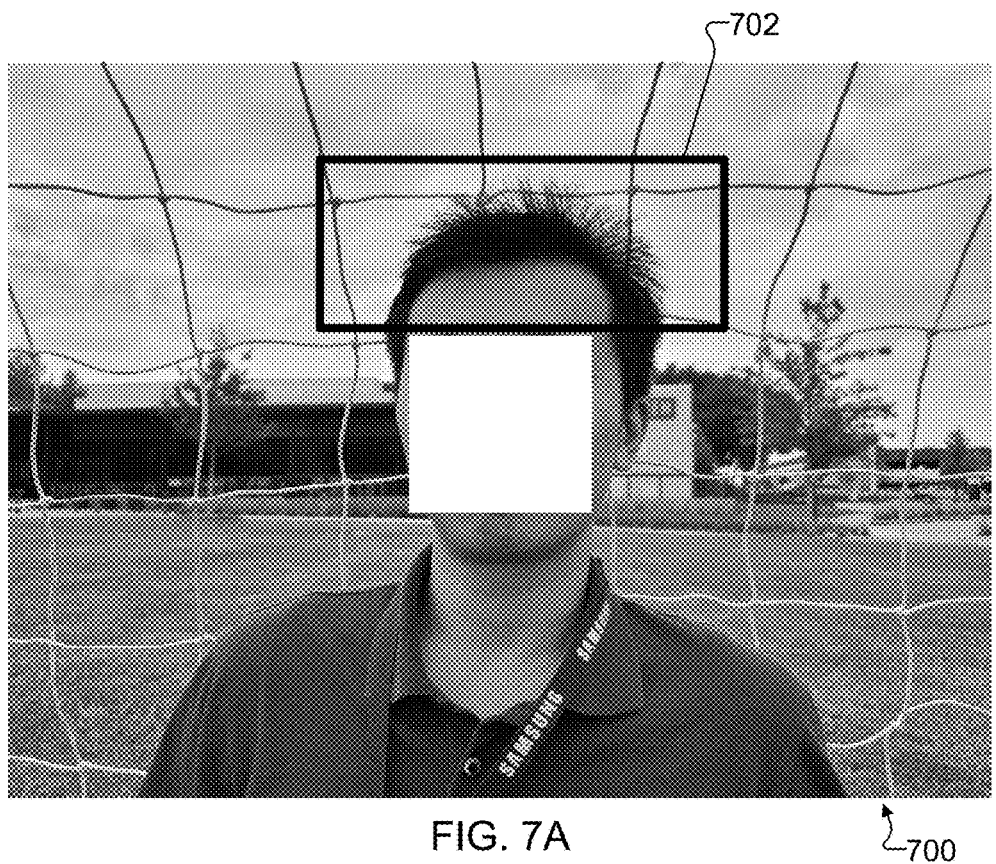
FIGS. 7A, 7B, and 7C illustrate example results that can be obtained using super-resolution depth map generation in a multi-camera or other environment in accordance with this disclosure.
Figure 7B:
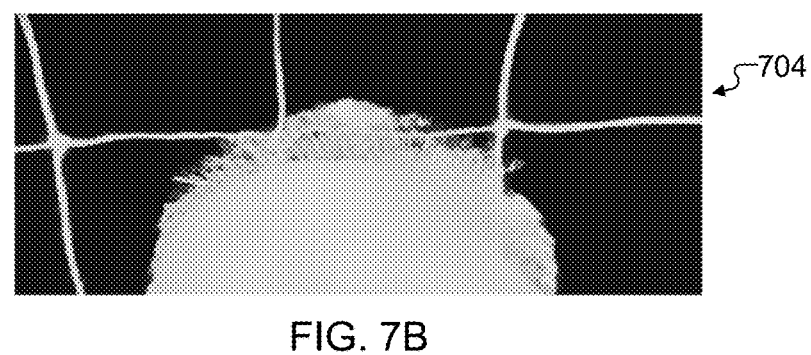
Figure 7C:
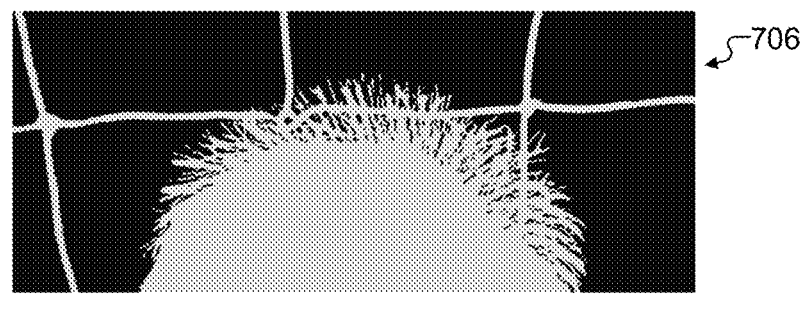

FIGS. 7A, 7B, and 7C illustrate example results that can be obtained using super-resolution depth map generation in a multi-camera or other environment in accordance with this disclosure. In FIG. 7A, a high-resolution input image frame 700 of a scene is captured. Here, the scene includes a person (whose face has been obscured for privacy) standing in front of a soccer net. A region 702 of the input image frame 700 is identified in FIG. 7A, and two depth maps 704 and 706 associated with that region 702 of the input image frame 700 are shown in FIGS. 7B and 7C.

The depth map 704 shown in FIG. 7B is generated using a standard process, such as by generating a low-resolution depth map and then upsampling the depth map. The depth map 706 shown in FIG. 7C is generated using one of the techniques described above. As can be seen in FIG. 7B, the region of the input image frame 700 associated with the person's hair lacks finer details, and the soccer net behind the person's hair tends to be somewhat lost or obscured. As can be seen in FIG. 7C, the region of the input image frame 700 associated with the person's hair includes much finer details, and the soccer net behind the person's hair is clearly defined. This indicates that the techniques described above can be used to recover lost details and correct errors, thereby producing more accurate high-resolution depth maps compared to simply upsampling low-resolution depth maps. Moreover, the high-resolution depth maps can be obtained using significantly fewer calculations and in significantly shorter time.

Although FIGS. 7A, 7B, and 7C illustrate examples of results that can be obtained using super-resolution depth map generation in a multi-camera or other environment, various changes may be made to FIGS. 7A, 7B, and 7C. For example, FIGS. 7A, 7B, and 7C are merely meant to illustrate one example of the type of results that could be obtained using the approaches described in this disclosure. Obviously, images of scenes can vary widely, and the results obtained using the approaches described in this patent document can also vary widely depending on the circumstances.

Figure 8:
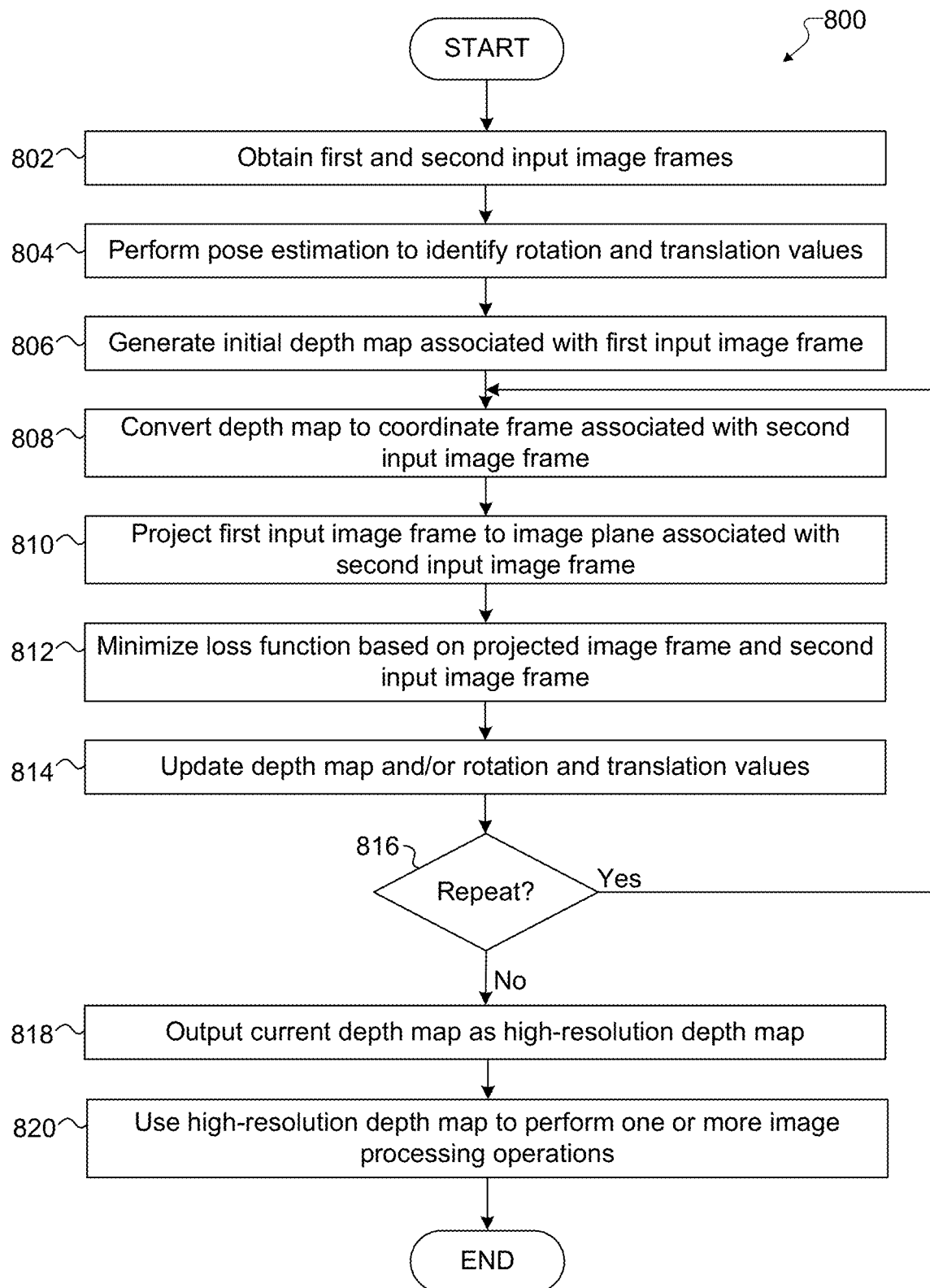
FIG. 8 illustrates an example method for super-resolution depth map generation in a multi-camera or other environment in accordance with this disclosure.

FIG. 8 illustrates an example method 800 for super-resolution depth map generation in a multi-camera or other environment in accordance with this disclosure. For ease of explanation, the method 800 shown in FIG. 8 is described as involving the use of the electronic device 101 in the network configuration 100 of FIG. 1, where the electronic device 101 can support one of the techniques 200, 400 described above. However, the method 800 shown in FIG. 8 could be used with any other suitable device and in any other suitable system.

As shown in FIG. 8, first and second input image frames are obtained at step 802. This may include, for example, the processor 120 of the electronic device 101 obtaining input image frames 202, 204 or 402, 404 from one or more cameras or other imaging sensors 180. The input image frames 202, 204 or 402, 404 may be obtained in various ways, such as simultaneously using multiple cameras or other imaging sensors 180 or sequentially using a single camera or other imaging sensor 180. Pose estimation is performed to identify rotation and translation values associated with the first and second input image frames at step 804. This may include, for example, the processor 120 of the electronic device 101 performing the pose estimation function 302, 502 to generate rotation and translation values 304, 504, which define how the image planes for the input image frames 202, 204 or 402, 404 differ. An initial depth map associated with the first input image frame is generated at step 806. This may include, for example, the processor 120 of the electronic device 101 generating a low-resolution depth map 206, 508 and performing upsampling to produce an initial higher-resolution depth map 308, 601.

The depth map is converted from the coordinate frame associated with the first input image frame to the coordinate frame associated with the second input image frame at step 808. This may include, for example, the processor 120 of the electronic device 101 identifying a point cloud from the depth map 308, 601, where the point cloud includes a large number of points in the depth map 308, 601. This may also include the processor 120 of the electronic device 101 applying the current rotation and translation values 304, 504 to the identified point cloud in order to identify corresponding points in a converted depth map 312, 612. The first input image frame is projected from an image plane associated with the first input image frame to an image plane associated with the second input image frame at step 810. This may include, for example, the processor 120 of the electronic device 101 projecting the first input image frame 202, 402 to the image plane associated with the second input image frame 204, 404 using the converted depth map 312, 612 to produce a projected image frame 316, 616.

A loss function is minimized based on the projected image frame and the second input image frame at step 812, and one or more updates are made to the current depth map and/or the current rotation and translation values at step 814. This may include, for example, the processor 120 of the electronic device 101 using a loss function that is based on a combination of (i) a measure of photometric loss between the second input image frame 204, 404 and the projected image frame 316, 616, (ii) a measure of total variance in the current depth map 308, 601, and (iii) a measure of errors between edges identified in the first input image frame 202, 402 and edges identified in the current depth map 308, 601. One specific example of a loss function is shown in Equation (1) above, although other loss functions may be used here. This may also include the processor 120 of the electronic device 101 updating the current depth map 308, 601 and/or the current rotation and translation values 304, 504 based on the results of the loss minimization.

If further updating is to occur at step 816, the process returns to step 808 to repeat the conversion, projection, loss minimization, and update steps based on the updated depth map and/or the updated rotation and translation values. Note that step 816 here may or may not involve an active determination of whether to repeat an iteration. For example, an active determination can be made in FIG. 3, where another iteration may occur if the measured loss is not below a specified threshold value or a specified number of iterations have not yet been completed. In other cases, such as in FIG. 5 where a specified number of DSR layers 514a-514e are used, the conversion, projection, loss minimization, and update steps can be repeated automatically by feeding the results from one DSR layer to the next, until the last DSR layer 514e is reached. Also note that in FIG. 3, the conversion, projection, loss minimization, and update steps may occur only once if the generated depth map satisfies the specified threshold value.

At some point, the conversion, projection, loss minimization, and update steps end, and the current depth map is output as a high-resolution depth map at step 818. This may include, for example, the processor 120 of the electronic device 101 outputting the current depth map as the high-resolution depth map 210, 410. Ideally, the high-resolution depth map 210, 410 is more accurate and contains more detail compared to the initial depth map 308, 601. Also, the high-resolution depth map 210, 410 can be produced using significantly fewer calculations and in significantly shorter time. The high-resolution depth map may then be used in any suitable manner, such as to perform one or more image processing operations at step 820. This may include, for example, the processor 120 of the electronic device 101 or some other component using the high-resolution depth map 210, 410 to perform one or more functions, such as bokeh image generation, depth-aware deblurring, image relighting, AR/MR, visual SLAM, odometry, or animoji-related processes.

Although FIG. 8 illustrates one example of a method 800 for super-resolution depth map generation in a multi-camera or other environment, various changes may be made to FIG. 8. For example, while shown as a series of steps, various steps in FIG. 8 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
   obtaining, using at least one processor, first and second input image frames, the first and second input image frames associated with first and second image planes, respectively;
   obtaining, using the at least one processor, a depth map associated with the first input image frame; and
   producing another version of the depth map by performing one or more times:
   converting the depth map from a coordinate frame associated with the first image plane to a coordinate frame associated with the second image plane;
   projecting, using the at least one processor, the first input image frame to the second image plane in order to produce a projected image frame using (i) the converted depth map and (ii) information identifying a conversion from the first image plane to the second image plane; and
   adjusting, using the at least one processor, at least one of the depth map and the information identifying the conversion from the first image plane to the second image plane to reduce a difference between the projected image frame and the second input image frame.

2. The method of claim 1, wherein the information identifying the conversion from the first image plane to the second image plane is used to convert the depth map from the coordinate frame associated with the first image plane to the coordinate frame associated with the second image plane.

3. The method of claim 1, wherein adjusting at least one of the depth map and the information comprises:
   minimizing a loss function that is based on the difference between the projected image frame and the second input image frame; and
   adjusting at least one of the depth map and the information based on the minimization of the loss function.

4. The method of claim 3, wherein:
   the information identifying the conversion from the first image plane to the second image plane comprises rotation and translation values; and
   the loss function is based on a combination of (i) a measure of photometric loss between the second input image frame and the projected image frame, (ii) a measure of total variance in the depth map, and (iii) a measure of errors between edges identified in the first input image frame and edges identified in the depth map.

5. The method of claim 1, further comprising:
   generating the depth map associated with the first input image frame, the depth map comprising a higher-resolution depth map generated by upsampling a lower-resolution depth map.

6. The method of claim 5, wherein generating the depth map comprises:
   applying multiple machine-learning convolutional layers to at least one of the first and second input image frames in order to produce the lower-resolution depth map; and
   applying a machine-learning upsampling layer to the lower-resolution depth map in order to generate the higher-resolution depth map.

7. The method of claim 6, wherein adjusting at least one of the depth map and the information comprises:
   applying multiple machine-learning guided depth super-resolution layers to the higher-resolution depth map, each machine-learning guided depth super-resolution layer projecting the first input image frame to the second image plane and adjusting at least one of the depth map and the information, a last of the machine-learning guided depth super-resolution layers outputting the other version of the depth map.

8. An apparatus comprising:
   at least one memory configured to store first and second input image frames, the first and second input image frames associated with first and second image planes, respectively; and
   at least one processor configured to:
   obtain a depth map associated with the first input image frame; and
   produce another version of the depth map;
   wherein, to produce the other version of the depth map, the at least one processor is configured to, one or more times:
   convert the depth map from a coordinate frame associated with the first image plane to a coordinate frame associated with the second image plane;
   project the first input image frame to the second image plane in order to produce a projected image frame using (i) the converted depth map and (ii) information identifying a conversion from the first image plane to the second image plane; and
   adjust at least one of the depth map and the information identifying the conversion from the first image plane to the second image plane to reduce a difference between the projected image frame and the second input image frame.

9. The apparatus of claim 8, wherein the information identifying the conversion from the first image plane to the second image plane is used to convert the depth map from the coordinate frame associated with the first image plane to the coordinate frame associated with the second image plane.

10. The apparatus of claim 8, wherein, to adjust at least one of the depth map and the information, the at least one processor is configured to:
    minimize a loss function that is based on the difference between the projected image frame and the second input image frame; and
    adjust at least one of the depth map and the information based on the minimization of the loss function.

11. The apparatus of claim 10, wherein:
    the information identifying the conversion from the first image plane to the second image plane comprises rotation and translation values; and
    the loss function is based on a combination of (i) a measure of photometric loss between the second input image frame and the projected image frame, (ii) a measure of total variance in the depth map, and (iii) a measure of errors between edges identified in the first input image frame and edges identified in the depth map.

12. The apparatus of claim 8, wherein:
    the at least one processor is further configured to generate the depth map associated with the first input image frame; and
    to generate the depth map, the at least one processor is configured to upsample a lower-resolution depth map and produce a higher-resolution depth map.

13. The apparatus of claim 12, wherein, to generate the depth map, the at least one processor is configured to:

apply multiple machine-learning convolutional layers to at least one of the first and second input image frames in order to produce the lower-resolution depth map; and apply a machine-learning upsampling layer to the lower-resolution depth map in order to generate the higher-resolution depth map.

14. The apparatus of claim 13, wherein:

to adjust at least one of the depth map and the information, the at least one processor is configured to apply multiple machine-learning guided depth super-resolution layers to the higher-resolution depth map;

each machine-learning guided depth super-resolution layer is configured to project the first input image frame to the second image plane and adjust at least one of the depth map and the information; and a last of the machine-learning guided depth super-resolution layers is configured to output the other version of the depth map.

15. A non-transitory computer readable medium containing instructions that when executed cause at least one processor to:

obtain first and second input image frames, the first and second input image frames associated with first and second image planes, respectively;

obtain a depth map associated with the first input image frame; and produce another version of the depth map;

wherein the instructions that when executed cause the at least one processor to produce the other version of the depth map comprise instructions that when executed cause the at least one processor to, one or more times:

convert the depth map from a coordinate frame associated with the first image plane to a coordinate frame associated with the second image plane;

project the first input image frame to the second image plane in order to produce a projected image frame using (i) the converted depth map and (ii) information identifying a conversion from the first image plane to the second image plane; and adjust at least one of the depth map and the information identifying the conversion from the first image plane to the second image plane to reduce a difference between the projected image frame and the second input image frame.

16. The non-transitory computer readable medium of claim 15, wherein the information identifying the conversion from the first image plane to the second image plane is used to convert the depth map from the coordinate frame associated with the first image plane to the coordinate frame associated with the second image plane.

17. The non-transitory computer readable medium of claim 15, wherein the instructions that when executed cause the at least one processor to adjust at least one of the depth map and the information comprise:

instructions that when executed cause the at least one processor to:

minimize a loss function that is based on the difference between the projected image frame and the second input image frame; and adjust at least one of the depth map and the information based on the minimization of the loss function.

18. The non-transitory computer readable medium of claim 15, further containing instructions that when executed cause the at least one processor to:

generate the depth map associated with the first input image frame by upsampling a lower-resolution depth map to produce a higher-resolution depth map.

19. The non-transitory computer readable medium of claim 18, wherein the instructions that when executed cause the at least one processor to generate the depth map comprise:

instructions that when executed cause the at least one processor to:

apply multiple machine-learning convolutional layers to at least one of the first and second input image frames in order to produce the lower-resolution depth map; and apply a machine-learning upsampling layer to the lower-resolution depth map in order to generate the higher-resolution depth map.

20. The non-transitory computer readable medium of claim 19, wherein:

the instructions that when executed cause the at least one processor to adjust at least one of the depth map and the information comprise:

instructions that when executed cause the at least one processor to apply multiple machine-learning guided depth super-resolution layers to the higher-resolution depth map;

each machine-learning guided depth super-resolution layer is configured to project the first input image frame to the second image plane and adjust at least one of the depth map and the information; and a last of the machine-learning guided depth super-resolution layers is configured to output the other version of the depth map.

\* \* \* \* \*